Nov. 4, 1969 D. I. THORNTON Re. 26,706

RADIATOR WATER FILTER

Original Filed Aug. 8, 1963

INVENTOR.
DONALD I. THORNTON
BY
Charles E. Willson
ATTORNEY

United States Patent Office

Re. 26,706
Reissued Nov. 4, 1969

26,706

RADIATOR WATER FILTER

Donald I. Thornton, Warwick, R.I., assignor, by mesne assignments, to Fram Corporation, East Providence, R.I., a corporation of Delaware Original No. 3,321,083, dated May 23, 1967, Ser. No. 300,826, Aug. 8, 1963. Application for reissue Oct. 16, 1968, Ser. No. 769,454

Int. Cl. B01d *15/00*

U.S. Cl. 210—198 4 Claims

Matter enclosed in heavy brackets [ ] appears in the original patent but forms no part of this reissue specification; matter printed in italics indicates the additions made by reissue.

*ABSTRACT OF THE DISCLOSURE*

*A water filter and conditioner for the cooling system of an internal combustion engine. The filter has a corrosion inhibitor adsorbed therein to act as the water conditioner.*

This invention relates to a water filter and water conditioner for the water or other liquid used in the cooling system of an internal combustion engine, and more particularly to a filter cartridge that will supply a corrosion inhibitor to the metal parts of the cooling system.

The coolant will carry the inhibitor, such as a water soluble or dispersible liquid corrosion inhibitor, to the various parts of the water circulating system so that it will leave the water or other coolant and form a protective film on the metal parts.

If water is used in the cooling system it will tend to rust the ferrous parts thereof and corrode the non-ferrous metal parts; and if a coolant other than water is used, such as an antifreeze coolant, it may also adversely affect the metal parts of the cooling system.

To keep such coolant clean and protect the metal parts of the cooling system, it has been the practice heretofore to install a filter at some point in the coolant circuit. It has also been common practice heretofore to add a water soluble or dispersible liquid or soluble corrosion inhibitor to the cooling liquid to protect the walls of the cooling system from injurious action of the water or other coolant.

However many owners of motor vehicles may neglect to take any steps to protect the cooling system of their vehicle engine from the corrosive action of the coolant. Therefore the present invention contemplates a filter for the circulating coolant, which will filter the coolant and also supply such coolant with a rust or corrosion inhibitor. As a result, when a filter such as herein contemplated is used it will keep the coolant clean and protect the metal parts of the cooling system from the injurious action of the coolant; and each time a filter cartridge is changed, an added supply of a water soluble or dispersible inhibitor wil be delivered into the coolant to protect the metal parts of the cooling system.

The filter herein contemplated for the cooling system may be variously constructed, and it may be installed on the engine block or at any other suitable point in the circulating system. The important feature of the present invention resides in a filter having a filter cartridge that is provided with a pleated paper filter element which has absorbed a substantial amount of a water soluble or dispersible liquid corrosion inhibitor to be released in the coolant.

Pleated paper such as has been used heretofore to filter water and oil is preferred because it is found that such paper, even when treated with the usual stiffening resin such as phenol formaldehyde, will absorb liquid and retain a large quantity of water soluble or dispersible corrosion inhibitor to be released in the water or other coolant when the hot coolant passes through the filter cartridge.

The combined filter and water conditioner herein contemplated may be either a part-flow or a full-flow filter, but for most purposes a part-flow filter is desired so as not to retard appreciably the rapid flow of the coolant to and from the engine parts to be cooled. The filter housing for the filter cartridge may have a removable cover so that the cartridge may be replaced from time to time therein, or the cartridge may be permanently mounted in a screw-on, throw-away type of filter housing so that the cartridge and housing are discarded as a unit.

The water filter and water conditioner of the present invention may be used whether water or some other coolant is used in the engine cooling system. Therefore, the term "water" as used in the specification and claims is to be construed broadly as covering water and other coolants such as are commonly used in the engine radiator.

The above and other features of the present invention will be further understood when read in connection with the accompanying drawing, wherein.

Figure 1:
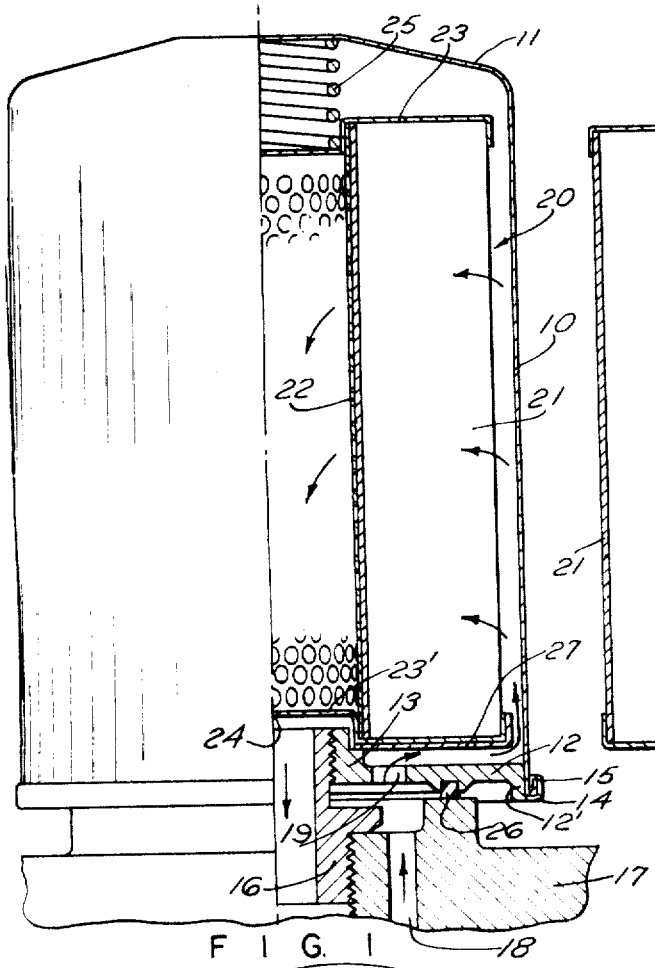
FIG. 1 is a side elevation with parts in section of a screw-on, throw-away filter provided with a pleated paper cartridge of the present invention.
Figure 2:
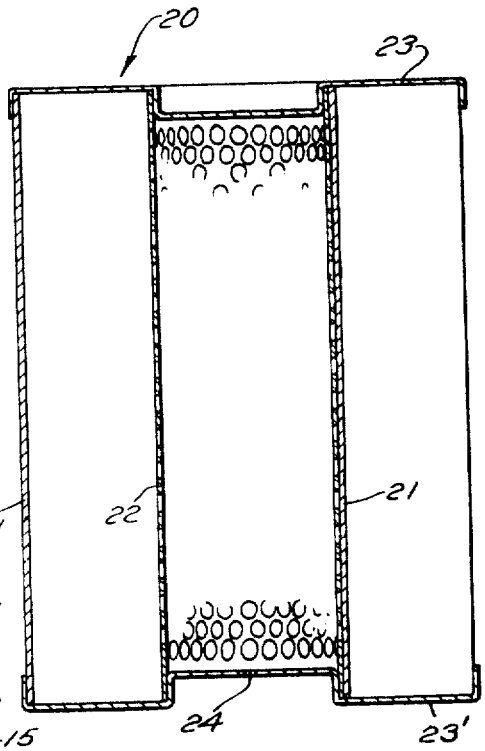
FIG. 2 is a vertical sectional view through the filter cartridge shown in FIG. 1.
Figure 3:
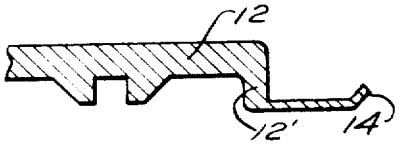
FIG. 3 is a detailed view of the peripheral flanged portion of the reinforcing plate.
Figure 4:
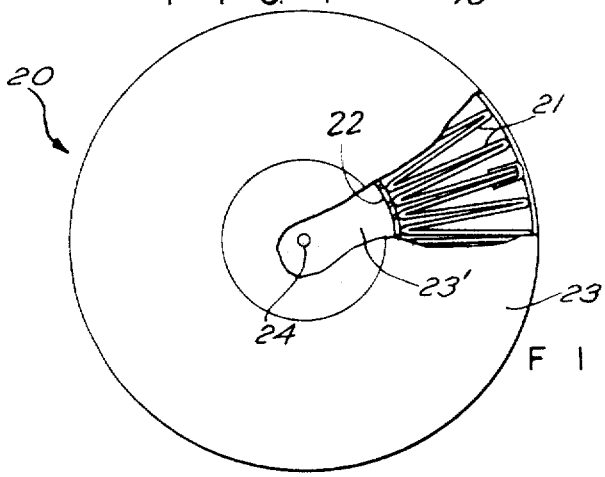
FIG. 4 is a top plan view with parts in section of the filter cartridge of FIG. 2.

Referring first to FIG. 1 of the drawing, the filter cartridge treated in accordance with the present invention is permanently mounted in a screw-on, throw-away type of filter housing substantially as disclosed in the Coates et al. Patent No. 2,888,141. This housing is conveniently made of sheet metal drawn to the shape of the cup-shaped housing 10 which has the closed upper end 11.

After the filter cartridge, to be described, is placed in such housing, the lower end of the housing is closed by a reinforcing plate 12 having the central internally threaded neck 13.

Since the filter of the present invention is to be employed as a radiator water filter, the housing 10, 11 and reinforcing plate 12 are preferably formed of aluminum so as not to rust. Therefore the plate 12 is shown as having the annular projecting fin 14 formed as an integral part of the downwardly extending flange 12' of the plate 12. This fin 14 is secured to the lower end of the housing by the rolled seam 15.

The neck 13 is internally threaded so that it may be screwed onto supporting means such as the externally threaded adaptor 16 which is shown as threadedly secured to a portion 17 of the engine block. The flow of the coolant, in the construction shown, is, as indicated by the arrows, upwardly through the passage 18 in the engine block and then through holes 19 formed in the plate 12 around the neck 13, to enter the housing 10, where it surrounds and flows inwardly through the filter cartridge and then passes out through the opening in the neck 13.

Within the housing 10 is permanently mounted the annular filter cartridge 20, formed of the pleated paper 21. These pleats surround and rest against the perforated center tube 22. The upper end of the cartridge 20 is closed by the metal end plate 23 which is secured to the upper ends of the pleats 21 by a suitable bonding agent such as plastisol. To the lower end of the cartridge is secured by a similar adhesive the end plate 23' having a small central outlet opening 24. The cartridge 20 is shown as having its lower end supported in spaced relation to the plate 12 by a shoulder on the neck 13, and the cartridge is held firmly seated on such neck by a coiled spring 25 confined between the inner face of the end wall 11 and the depressed central portion of the end plate 23. A sealing annular gasket 26 is confined between the engine block and filter wall 12. A magnesium disc 27 having a cut-out center preferably rests on the supporting shoulder of the adaptor 16 to rest against the lower end plate 23', where it is exposed to the coolant. Such disc 27 will control or minimize electrolysis.

The flow through the cartridge 20 is in the outside-in direction as indicated by the arrows. The lower end plate 23' has the small outlet hole 24 so as to limit the amount of coolant that passes through the filter cartridge. This is usual in part-flow cartridges. If a full-flow cartridge is employed, then the hole 24 would be much larger.

All metal parts so far described may be varied extensively, but they preferably are formed of aluminum so as not to present any rust problem. The water or other coolant acts as a carrier to convey the inhibitor to the metal parts of the cooling system .

The present invention, as above stated, resides in a pleated paper filter cartridge such, for example, as indicated by 20 but which has been saturated close to its liquid-retaining capacity with a water soluble or dispersible liquid corrosion inhibitor. It is desirable to load the paper with as much inhibitor as it will retain without dripping during the shelf life of the filter. If the cartridge is loaded to the dripping stage, the excess inhibitor will be wasted and the dripping inhibitor will make the filter messy to handle. If the cartridge is of the replaceable type for a filter housing, then any inhibitor that leaks from the pleated paper will make the cartridge, and possibly the box in which it is packed, messy to handle.

The water soluble or dispersible inhibitor applied to the pleated paper filter element should be such that it will be readily picked up by the coolant and carried thereby to the metal parts to leave the coolant and coat the metal parts with a protecting film. Also the inhibitor should be compatible with the various types of water and antifreeze coolant that are likely to be used in the radiator cooling system for motor vehicles.

One such water or coolant corrosion inhibitor that works well when used as above described is a water dispersible sulfonated mineral oil that has a flash point of 345° F., specific gravity of 0.872 at 25° C., and a viscosity of 30 centipoise at 25° C., and Arnold Hoffman product LP-2560. It is found that a relatively thick porous filter paper such as above described and treated with a stiffening resin, such as phenol formaldehyde, will absorb and retain two or more times its dry weight of such an inhibitor. It is also found that such an inhibitor does not soften or adversely affect the phenol formaldehyde resin.

Other similar corrosion inhibitors are sulfonated vegetable oils, blends of sulfonated vegetable oils and sulfonated mineral oils, and also any water dispersible or soluble compound having a polar/non-polar molecular structure which will tenaciously adhere as a protective coating on the metal surfaces of the cooling system with the polar end of the molecule affixed to the metal surface and the non-polar end acting as a barrier film between the metal surface and the water or coolant electrolyte.

It will be seen from the foregoing that if a filter cartridge such as above described is loaded with a water soluble or corrosion inhibitor such as just described to a point close to its inhibitor-retaining capacity, then when such cartridge is used to filter the water or other coolant in an engine radiator, the cartridge wil clean the coolant and also release therein an inhibitor that will form a protecting film on the various metal parts of the radiator cooling system. As a result of this development the vehicle owner need not worry about adding a rust and corrosion inhibitor to the radiator coolant, for if he changes the filter cartridge when needed, the cartridge will remove the rust, scale and other dirt particles that might plug the restricted passage of the cooling system, and will supply a corrosion inhibitor to the coolant to be carried thereby to the metal parts of the cooling system.

Having thus described my invention, what I claim and desire to protect by Letters Patent is:

1. A combined water filter and water conditioner for the water in the cooling system of an internal combustion engine, comprising a water filter housing connected in the cooling system so that at least part of the circulating water will pass through the housing, a [pleated paper] filter cartridge *containing a filter medium* within said housing, said [paper] *medium* having absorbed therein, an amount close to its liquid-retaining capacity, a water soluble or dispersible liquid corrosion inhibitor so that this inhibitor will be picked up by the water passing through the cartridge and deposited as a protective film on the walls of the radiator and cooling passages of the engine.

2. A screw-on throw-away type of water filter and water conditioner for the water in the cooling system of an internal combustion engine, comprising a screw-on type of filter housing connected in the cooling system so that at least part of the circulating water will pass through the housing, a [pleated paper] filter cartridge *containing a filter medium* permanently mounted in said housing, said [paper] *medium* having absorbed therein, in an amount close to its liquid-retaining capacity, a water soluble or dispersible liquid corrosion inhibitor so that this inhibitor will be picked up by the water passing through the cartridge and deposited as a protective film on the walls of the radiator and cooling passages of the engine.

3. A replaceable filter cartridge for use in connection with the cooling system of an internal combustion engine to filter and condition such water, a housing connected in the cooling system so that at least part of the circulating water will pass therethrough and adapted to house said cartridge, said cartridge having a [pleated paper] filter element that has absorbed therein, in an amount close to its liquid-retaining capacity, a water soluble or dispersible liquid corrosion inhibitor so that this inhibitor will be picked up by the water passing through the paper and deposited thereby as a protective film on the radiator and cooling passages of the engine.

4. A filter cartridge as in claim 3 wherein *said element is of pleated paper and* the weight of the inhibitor absorbed by the paper is greater than the weight of the inhibitor-free paper.

References Cited

The following references, cited by the Examiner, are of record in the patented file of this patent or the original patent.

UNITED STATES PATENTS

| | | | |
|---|---|---|---|
| 1,987,847 | 1/1935 | Flood | 210—167 |
| 2,785,805 | 3/1957 | Hough | 210—501 |
| 2,796,989 | 6/1957 | Kovacs | 210—282 |
| 2,855,330 | 10/1958 | Griswold et al. | |
| 2,877,902 | 3/1959 | Chase et al. | |
| 2,893,561 | 7/1959 | Duzich. | |

FOREIGN PATENTS

| | | |
|---|---|---|
| 715,454 | 9/1954 | Great Britain. |

REUBEN FRIEDMAN, Primary Examiner

C. DITLOW, Assistant Examiner

U.S. Cl. X.R.

210—440, 501; 252—395